United States Patent
Mermelstein

[15] 3,699,819
[45] Oct. 24, 1972

[54] PRECISION LINEAR MOTION CONVERTING AND POSITION MEASURING APPARATUS

[72] Inventor: Seymour Mermelstein, Newton, Mass.

[73] Assignee: Tyco Laboratories, Inc., Waltham, Mass.

[22] Filed: Aug. 6, 1970

[21] Appl. No.: 61,725

[52] U.S. Cl. ................................ 74/25, 74/89.22
[51] Int. Cl. .................................... F16h 27/02
[58] Field of Search .......... 74/25, 89.2, 89.21, 89.22; 318/592; 250/211, 231; 33/123

[56] References Cited

UNITED STATES PATENTS

| | | |
|---|---|---|
| 3,210,632 | 10/1965 | Benton et al. .............. 318/592 |
| 3,264,739 | 8/1966 | Berlinsky et al. ............ 33/123 |
| 3,467,900 | 9/1969 | Benton ...................... 318/592 |
| 3,571,932 | 3/1971 | Peddie ....................... 33/123 |
| 396,430 | 1/1889 | Reichel ...................... 74/89.22 |

Primary Examiner—William F. O'Dea
Assistant Examiner—Wesley S. Ratliff, Jr.
Attorney—Schiller & Pandiscio

[57] ABSTRACT

A roller-band device including an idler roller, drive roller and band, is mounted on a carriage movable linearly relative to the band so that the angle of rotation of the drive roller is related to the distance traveled by the carriage. The drive roller can be driven to convert rotary motion to linear motion or the carriage can be driven to convert linear motion to rotary motion. Means including a pulse generator coupled to the drive roller produces a very accurate readout of the position of the carriage.

14 Claims, 6 Drawing Figures

PATENTED OCT 24 1972

INVENTOR
SEYMOUR MERMELSTEIN

BY
*Schiller & Pandiscio*

ATTORNEYS

3,699,819

INVENTOR
SEYMOUR MERMELSTEIN
BY Schiller & Pandiscio
ATTORNEYS

PRECISION LINEAR MOTION CONVERTING AND POSITION MEASURING APPARATUS

This application is concerned with a linear-rotary motion converter incorporating a roller-band device providing very accurate correlation between the linear motion of one component of the device and the rotary motion of another component. This application is particularly concerned with apparatus incorporating the roller-band device for producing a very accurate measurement of the distance traveled by the linearly movable component.

Roller-band drives useful, for example, as suspension systems, are disclosed in U.S. Pat. No. 3,471,668 dated Oct. 7, 1969, as including a roller-band cluster comprising a pair of aligned drive rollers and a resilient band having an S-shaped configuration convoluted around and between the rollers, and a guideway having a rectilinear cross section providing four planar surfaces for containing the roller-band cluster.

The primary objects of the invention are: to provide a novel and improved roller-band device particularly adapted for converting linear motion of the roller-band cluster into rotary motion of one of the rollers and vice versa; and to provide a device as described exhibiting extremely accurate correlation between linear travel of the rollers relative to the band and the angle of rotation of one of the rollers.

Motion converting devices of the type described and find utility in a variety of application in which a component of an apparatus is required to be moved linearly through a precise distance to an accurately determined position. Typical examples of such applications include measuring devices and machine tools. Rotary transducers are known for measuring angle of rotation with extreme accuracy, for example, ± 1 minute of arc. An example of an accurate, yet relatively inexpensive transducer for measuring angular position is a rotary pulse generator of the type having an output of thousands of electrical pulses per revolution, coupled with a pulse counter. With apparatus comprising the improved roller-band device of the invention in combination with a rotary pulse generator, it has been possible to establish the position of a linear movable member, such as the table of a milling machine, with a resolution of 0.0001 inch and an accuracy of ± 0.0001 inch. Moreover it has been possible to achieve similar accuracy over a wide range of distances and table positions, for example, 12 inches.

Thus with such an angular measuring device coupled with one of the rollers of applicant's improved roller-band cluster providing precise correlation between linear and rotary motion, it is possible to achieve another object of the invention, namely, the provision of a relatively inexpensive, yet extremely accurate, linear measuring apparatus.

Other objects of the invention will in part be obvious and will in part appear hereinafter.

The invention accordingly comprises the apparatus possessing the construction, combination of elements and arrangement of parts, which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
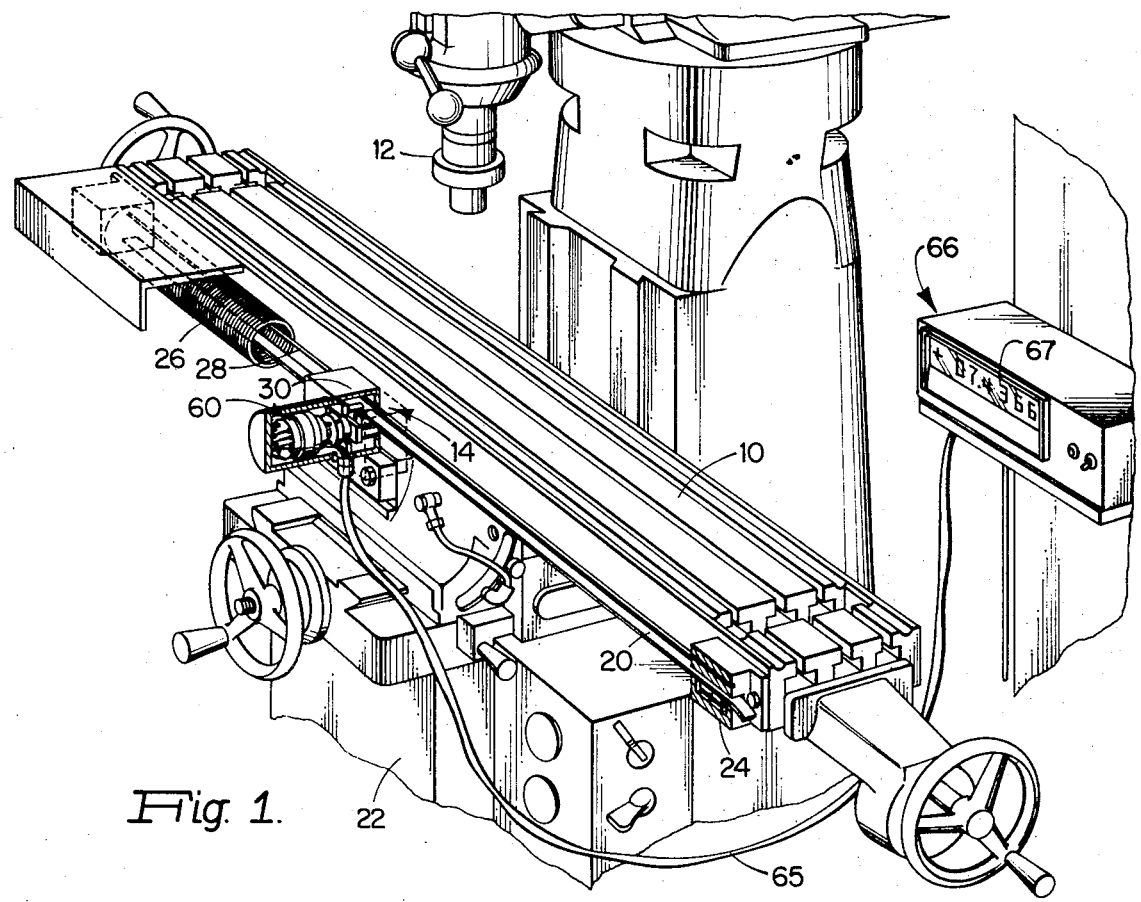
FIG. 1 is a perspective view, partially in section, illustrating the linear measuring apparatus coupled with the table of a milling machine to indicate the position of the table.
Figure 2:
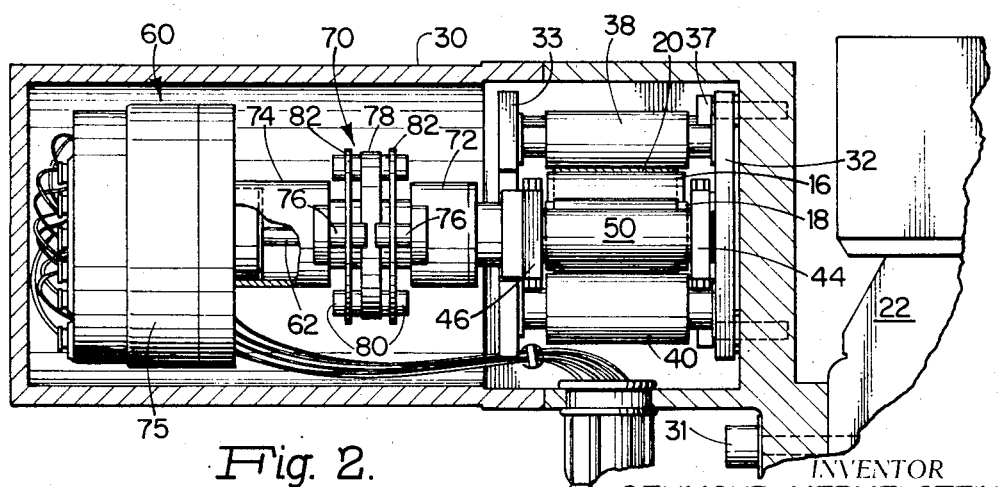
FIG. 2 is a side elevational view of the linear measuring apparatus of FIG. 1.

As previously noted, the improved roller-band device of the invention finds utility in measuring apparatus and particularly in machine tools in which it is necessary to accurately locate a work piece with respect to a tool. A typical machine tool in which the invention can be incorporated to advantage is a conventional milling machine such as illustrated in FIGS. 1 and 2, including a horizontal table 10 movable linearly with respect to a motor-driven spindle 12 on which a rotary cutting tool is mounted. The table is designed to support and move a workpiece linearly relative to the tool mounted on the stationary spindle. The length of travel of the table which supports the workpiece may be relatively long, i.e., several feet, and the apparatus of the invention is designed to accurately position the table throughout its entire travel distance.

Figure 3:
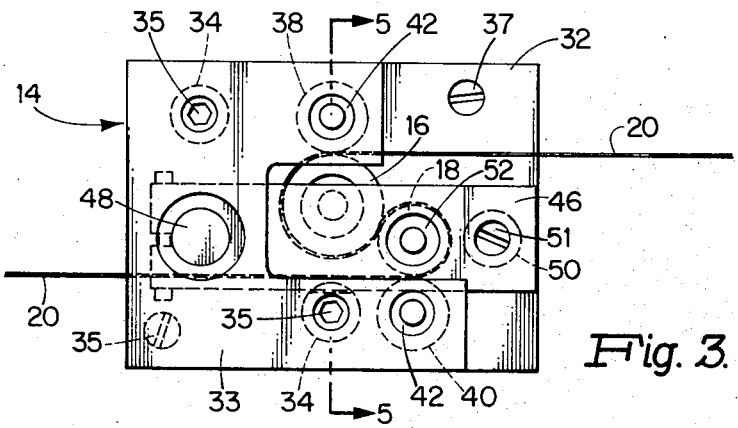
FIG. 3 is a front elevational view of the improved roller-band device of the invention.
Figure 4:
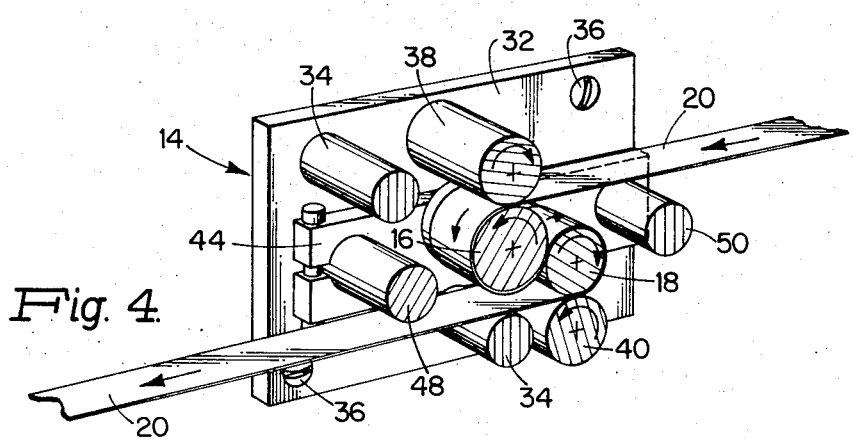
FIG. 4 is a perspective view, partially in section, of the device of FIG. 3.

A basic component of the linear measuring apparatus of the invention is a roller-band device, generally designated 14. As shown in detail in FIGS. 3 through 5, the roller-band device includes a roller-band cluster comprising a cylindrical idler roller 16, a cylindrical drive roller 18 and an elongated, resilient (flexible) band 20 including an intermediate portion convoluted in an S-shaped configuration around and between the idler and drive rollers. The rollers 16 and 18 are mounted on one of the two relatively movable (linearly) components of the apparatus, in this case, the base 22 of the milling machine on which the table is slidably mounted, and the band 20 is mounted on the other component, namely, the table 10 of the milling machine, so that the rollers move linearly relative to the band between which they are engaged. Clamps 24 mounted on table 10 are provided for securing the opposite ends of band 20 and holding the band 20 in tension. Two bellows 26 supported on a wire 28 having its ends attached to clamps 24 are provided for protectively enclosing band 20. Each of the bellows 26 (only one of the bellows is shown in FIG. 1 for convenience of illustration) is attached at one end to a clamp 24 and at its other end to a housing 30 protectively enclosing the roller-band cluster and other components of the apparatus. The housing 30 is attached to the milling machine base by cap screws as shown at 31 in FIG. 2.

The improved roller-band device of the invention is especially adapted to establish a very accurate correlation between linear motion of rollers 16 and 18 relative to band 20 and the angle of rotation of drive roller 18. This requires a construction designed to eliminate errors due to friction, stretching of the band, temperature changes, variations in curvature and tangency of the band, and twisting, skewing, lateral movement and camber of the band. The band itself is formed of a thin flexible inelastic material such as steel, beryllium copper or the like, having a uniform thickness and width. All of the rollers which contact the band are cylindrical and except for idler roller 16, are journalled in precision bearings. All of the rollers are fabricated within close concentricity and eccentricity tolerances.

The roller band device includes a chassis or carriage comprising a flat rectangular side plate 32 and a U-shaped side plate 33 which are connected together and held in spaced parallel relation with each other by tie rods 34 which are secured to the plates by cap screws 35. The chassis is mounted within and secured to housing 30. In this connection it is to be noted that side plate 32 has a pair of holes 36 sized to accommodate cap screws 37 that are screwed into the rear wall 32 of the housing. The idler roller 16 and the drive roller 18 engage the convoluted S-shaped portion of band 20 and form a roller-band "cluster" which is adapted to move as a unit linearly relative to the band. To accomplish this, the cluster and the convoluted S-shaped portion of the band are confined between a pair of guide or idler rollers 38 and 40 journalled for rotation about parallel axes in precision bearings 42 mounted in side plates 32 and 33 of the chassis. Rollers 38 and 40 are mounted with their peripheries tangent to parallel planes spaced from one another by a distance less than the summation of the diameters of rollers 16 and 18 so that, because of the way the latter rolls are mounted as hereinafter described, tension on the band tends to force rollers 16 and 18 into line contact with one another and rollers 38 and through the intervening 40. Thus, the contact between the band and rollers 38 and 40 is along parallel lines and the initial and terminal points of tangency between the band and rollers 16 and 18 also lie on linear and parallel lines.

In order to provide for linear movement of the confining guide rollers 38 and 40 together with idler and drive rollers 16 and 18 relative to the band and to assure the aforementioned line contact, rollers 16 and 18 are mounted for movement relative to one another and rollers 38 and 40. The means for movably mounting rollers 16 and 18 is a pivotal frame which comprises a pair of arms 44 and 46 each having one end affixed to a shaft 48 that is rotatably mounted at its ends in side plates 32 and 34 so that its axis is parallel with the axes of rollers 38 and 40. Arms 44 and 46 are removably clamped to shaft 48 closely adjacent side plates 32 and 34 respectively, and are joined to one another near their free ends by a tie rod 50 which is secured to arms 44 and 46 by cap screws 51.

To prevent skewing of the band and variation in tangency between the band and rollers, drive roller 18 is journalled in precision bearings 52 (FIG. 3) mounted in arms 44 and 46 for rotation about an axis parallel with the axes of rollers 38 and 40 and shaft 48; and idler roller 16 is mounted for limited omnidirectional movement, i.e., axially and radially, with respect to the arms and drive roller 18. For this purpose and to relieve friction due to axial thrust, the ends of idler roller 16 are provided with tapered sockets 54 in which are disposed thrust balls 56 that engage arms 44 and 46. The arms 44 and 46 thus act as thrust pads for the balls 56 to limit the tendency of the idler roller to move axially.

The construction described provides minimum friction by virtue of the line contact between the guide rollers 38 and 40 and band 20. Slippage between the band and drive roller is eliminated as a result of the large angle of wrap of the band around idler roller 16 and drive roller 18 and the line contact effected by guide rollers 38 and 40. Any variations in the thickness of band 20 is compensated for by the fact that arms 44 and 46 can pivot and idler roller 16 can move radially to an extent limited by the tension in band 20.

Errors due to band expansion or contraction due, for example, to changes in temperature and/or stretching of the band are extremely small and can be considered negligible when the roller-band cluster as the motion converter, is employed over a limited range midway between the ends of the band since changes in length effectively result in a change in the tensile preload on the band. Additionally, when extreme accuracy is required, the converter normally can be expected to be employed in a temperature controlled environment in which temperature induced changes in band length and in the dimensions of the components of the apparatus with which the converter is coupled, cannot occur.

As previously noted, the motion converter is employed to drive a rotary device for accurately establishing the relative position of a linearly movable component (i.e., the table 10). For this latter purpose, (as shown in the drawings) a conventional rotary pulse generator designated 60 with an input shaft 62 is mounted for operation by drive roller 18. Pulse generator 60 is an incremental, direction sensing digital position transducer that converts rotary motion into digital information and may be a device as shown in U.S. Pat. Nos. 3096442, 3193744, or 3400275. Pulse generator 60 is adapted to generate in response to rotation of its input shaft two trains of pulses that are 90 electrical degrees out of phase with each other with each pulse representing a predetermined increment of the input shaft's angular displacement and includes bidirectional logic which determines the direction of shaft rotation by detecting which pulse train is in leading relation to the other. The pulse output of the pulse generator 60 is coupled by way of a cable 65 to a resettable electronic bi-directional (i.e., backward--forward) pulse counter 66 of conventional design adapted to produce by digital techniques from the output of the pulse generator a visible position readout as shown at 67 which indicates changes in position as small as 1/10,000 of an inch.

It is to be understood that the bi-directional logic for determining the direction of shaft rotation may be embodied in the counter 66 rather than in the pulse generator. By way of example, the bi-directional logic may be as shown in FIG. 8 of U.S. Pat. No. 3193744 or as disclosed on pages 18–36 and 18–37 of Huskey and Korn, Computer Handbook, First Edition, McGraw-Hill, 1962. Other bi-directional logic circuits capable of operating on the signal output of the pulse generator to provide an input for operating a reversible pulse counter are well-known to persons skilled in the art. Various forms of bi-directional counters suitable for use in the present invention also are known. By way of example, the counter may be of the type described in U.S. Pat. No. 3391342 and the position readout may be provided by an array of NIXIE tubes.

The rotatable input shaft 62 of pulse generator 60 is connected by a sleeve coupling 63 to a shaft 64 which is an integral axial extension of drive roller 18. Coupling 63 is secured to shafts 62 and 64 so that 62 will rotate at the same angular speed as drive roller 18. Since drive roller 18 is mounted on the frame comprising arms 44 and 46, the pulse generator is also mounted thereon. However, to prevent damage and due to shaft eccentricity, the pulse generator housing is mounted on arm 46 for limited radial, but not rotational, motion with respect to the arm. Mounting of the pulse generator is achieved by a flexible coupling 70 which comprises a hub 72 affixed to arm 46 and a hub 74 affixed to the housing 75 of pulse generator 60, a pair of diametrically opposed pin extensions 76 formed integral with hubs 72 and 74 respectively, an intermediate rigid circular plate 78 provided with two pairs of diametrically opposed pin extensions 80 projecting from opposite sides thereof, and two flexible discs 82 made of spring metal disposed on opposite sides of plate 78, with each disc secured to one pair of pin extensions 76 and one pair of pin extensions 80. The pin extensions 76 are displaced ninety degrees from pin extensions 80. Since the construction of the coupling will permit the two hubs to undergo limited swiveling movement but not rotate relative to one another, and since the hubs are affixed to the pulse generator housing and arm 46, the pulse generator is capable of moving laterally sufficient to prevent its being damaged by any eccentricity of roller 18. As an alternative measure, the coupling 70 may be replaced by a coupling as shown in U.S. Pat. No. 3,066,502. The essential thing is that the coupling allow the encoder housing to move laterally to compensate for runout of shaft 64 while preventing relative rotation between the housing and shaft 64.

Operation of the device described above is as follows. Assuming that a work piece is on table 10 and that the table is to be moved a predetermined distance lengthwise to perform another operation on the work piece at a precise location, the operator resets the counter to zero and then moves the table in the desired direction lengthwise by manipulating the appropriate mechanism of the machine. As the table is moved the roller band 20 moves relative to the chassis carrying the roller band cluster, and such relative movement between the band 20 and the chassis causes drive roller 18 to rotate, which in turn causes the input shaft of pulse generator 60 to rotate. As its input shaft rotates, the pulse generator supplies count pulses to the counter which in turn instantaneously counts the pulses and converts the pulse count to an exact measurement of the distance that the work piece and table have moved. The measured distance is displayed by the counter. If the operator moves the table too far and has to bring it back, the reverse movement will cause the counter to count backward. Because of the precision with which the roller-band cluster motion converter can be built and the fact that highly precise pulse generators of the type described are available at moderate cost, the invention makes possible a precision position measuring device at a cost that is small compared with that of existing systems capable of equal accuracy and resolution.

Figure 5:
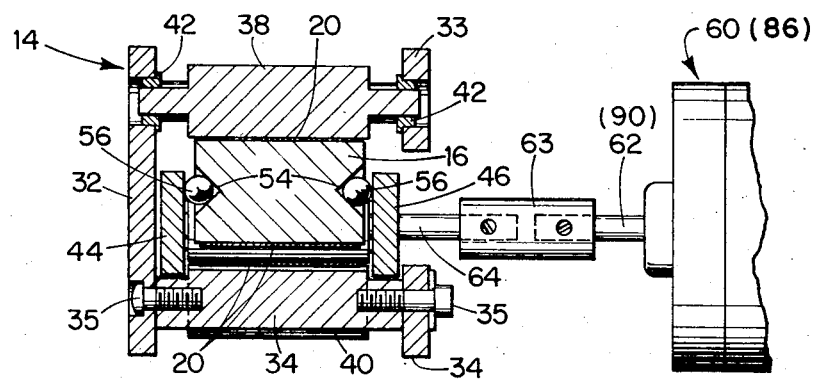
FIG. 5 is a sectional view taken substantially along the line 5—5 of FIG. 3.
Figure 6:
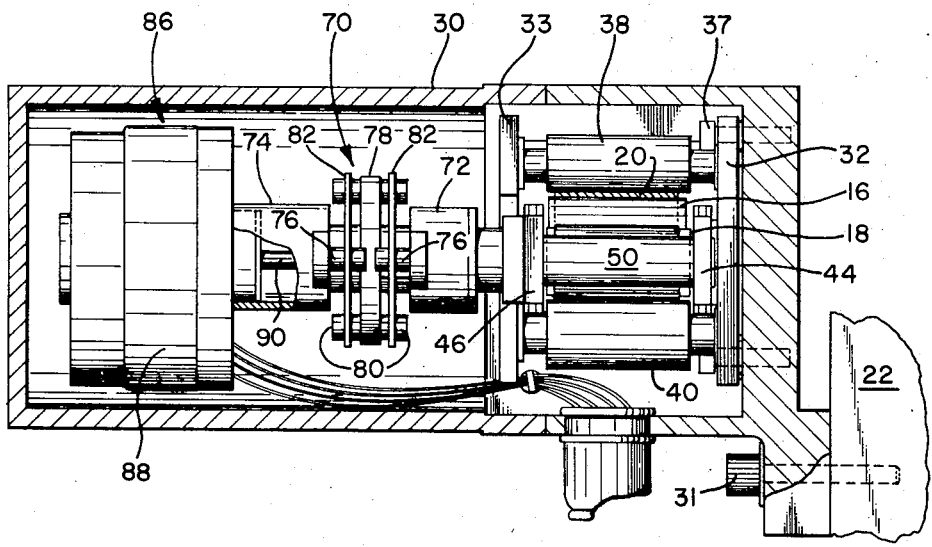
FIG. 6 illustrates a modification of the invention.

As previously noted, the motion converter of the invention can be employed to drive a component linearly, i.e., to move the roller-band cluster in one direction or the other along the band 20, in which case it functions as a rotary to linear motion converter. This is achieved as shown in FIGS. 5 and 6 by replacing pulse generator 60 with an electrical motor 86 so that the motor's housing 88 is affixed to the flexible coupling 70 and its output shaft 90 is mounted to sleeve coupling 63. Then with band 20 secured to one of two relative moveable (linearly) components under tension and the chassis of the roller-band cluster device secured to the other relatively moveable component, operation of the motor will cause roller 18 to rotate and, because of the engagement of rollers 16 and 18 with band 20, the roller-band cluster will travel along the band (or vice versa) and the two components will undergo relative linear movement. Whether the cluster or band actually moves depends on which of the two relatively moveable components is held stationary.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A motion converting device of the type described comprising, in combination:

an idler roller and a drive roller;

a resilient band having first and second ends;

a carriage;

a pair of guide rollers rotatably mounted to said carriage for rotation about parallel axes, said guide rollers being disposed so that their peripheries are tangent to parallel planes separated by a distance less than the summation of the diameters of said idler and drive rollers;

support means mounted to said carriage for pivotal motion about an axis parallel with the axes of said guide rollers;

said idler and drive rollers being rotatably mounted on said support means between said guide rollers, said drive roller being mounted with its axis parallel with the axes of said guide rollers and fixed with respect to the pivotal axis of said support means, said idler roller being mounted so that its axis of rotation is capable of translational motion relative to said drive roller; and said band including an intermediate portion that is convoluted about and between said idler and drive rollers and is engaged at one point by one of said guide rollers and said idler roll and at another point by the other of said guide rollers and said drive roll, said band being under tension between said ends thereof so as to urge said idler roller toward said drive roller and so that relative movement of said carriage and band along a line parallel to said planes and at a right angle to said idler and drive roller axes will cause rotation of said idler and drive rollers in opposite directions.

2. A motion converting device as defined in claim 1 wherein said idler roller is mounted on said support means for limited omnidirectional motion.

3. A motion converting device as defined in claim 1 including means for mounting said carriage for reciprocal linear motion relative to said band.

4. A motion converting device as defined in claim 1 further including means for mounting said carriage and band for relative reciprocal linear movement, and drive means mounted to said support means and coupled with said drive roller for rotating said drive roller so as to produce relative movement of said carriage and said band.

5. A motion converting device as defined in claim 3 further including drive means coupled with said carriage for moving said carriage linearly relative to said other portions of said band and means for restraining said other portions of said band against lengthwise motion.

6. A motion converting device as defined in claim 3 further including rotary driven means mounted on said carriage and coupled with said drive roller for rotation thereby through an angle related to the linear distance traveled by said carriage relative to said band.

7. A motion converting device as defined in claim 6 wherein said rotary driven means include a rotary shaft coupled with said drive roller for rotation coaxially therewith and a non-rotary component mounting said shaft for rotation and in turn mounted on said support means for limited radial motion relative to the axis of said shaft.

8. A motion converting device according to claim 1 wherein said support means comprises first and second spaced members to which said idler and drive rollers are mounted, and further wherein said idler roller is mounted to said space members by first and second roller bearings mounted in the opposite ends of said idler roller and engaging adjacent surfaces of said first and second spaced members respectively.

9. A motion converting device according to claim 1 wherein said carriage comprises a pair of spaced side plates and means holding said side plates in fixed parallel relation to each other, said guide rollers being rotatably mounted to said side plates, and further wherein said support means is disposed between said side plates on pivot means attached to said side plates.

10. A motion converting device according to claim 9 wherein said support means comprises a pair of spaced parallel arms and pivot means connecting said arms to said side plates, said arms extending between said guide rollers.

11. A motion converting device according to claim 10 wherein said pivot means define a pivot axis for said support means that is located between said parallel planes and is displaced laterally of said guide, idler and drive rolls.

12. A motion converting device comprising in combination:
a carriage;
a pair of spaced guide rollers rotatably mounted to said carriage so that their axes of rotation are parallel to each other;
support means pivotally mounted to said carriage, said support means having a pivot axis that is parallel to the axes of rotation of said spaced guide rollers;
a first roller and a second roller;
said first roller being rotatably mounted to said support means so that its axis of rotation is fixed with respect to said support means and is parallel to and spaced from said pivot axis and the axes of rotation of said guide rolls;
bearing means rotatably mounting said second roller to said support means so that the axis of rotation of said second roller is parallel to said pivot axis and the axes of rotation of said guide rollers and said first rollers, said bearing means being adapted to permit translational movement of said second roller relative to said first roller;
said guide rollers being disposed so that their peripheries are tangent to parallel planes which are separated by a distance less than the summation of the diameters of said first and second rollers, with one of said guide rollers being immediately adjacent to said first roll and the other guide roller being immediately adjacent to said second roll; and
a resilient band having first and second ends and including an intermediate portion that is convoluted about and between said first and second rollers and is engaged at one point by said first roller and one of said guide rollers and at another point by said second roller and the other of said guide rollers, said ends of said band extending away from said carriage and being under tension so that relative movement of said carriage and band will provide rotational movement of said first and second rollers and a relative movement of said band and said first and second rollers.

13. A device according to claim 12 further including holding means for anchoring said band ends and holding said band under tension, and means for providing relative straight-line movement of said holding means and said carriage.

14. A device according to claim 12 wherein the said ends of said band are anchored at spaced points, and commencing at one of said spaced points said band passes between one guide roll and said first roll, then around said first and second rolls to between said second roll and the other guide roll, and finally out from between said second rolls and said other guide roller to the other of said spaced points.

* * * * *